United States Patent
Brady et al.

(10) Patent No.: US 6,900,908 B1
(45) Date of Patent: May 31, 2005

(54) METHOD, SYSTEM, AND PROGRAM FOR HALFTONING DATA FOR RENDERING IN A MULTITONE OUTPUT DEVICE

(75) Inventors: Michael Thomas Brady, Longmont, CO (US); Joan LaVerne Mitchell, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 873 days.

(21) Appl. No.: 09/666,947

(22) Filed: Sep. 20, 2000

(51) Int. Cl.$^7$ .................. H04N 1/405; H04N 1/409
(52) U.S. Cl. ................. 358/2.1; 358/3.06; 358/3.21; 358/3.26
(58) Field of Search .................. 358/2.1, 3.06, 358/1.9, 3.01, 3.1, 3.14, 3.21, 3.22, 3.24, 3.26, 536, 534, 500, 3.13, 3.15, 3.23, 535; 382/270, 271, 272, 273, 3.24, 173, 176; 345/611

(56) References Cited

U.S. PATENT DOCUMENTS

| | | | | |
|---|---|---|---|---|
| 4,926,251 A | * | 5/1990 | Sekizawa et al. | 358/535 |
| 4,984,283 A | * | 1/1991 | Sakano | 382/206 |
| 5,291,311 A | * | 3/1994 | Miller | 358/3.23 |
| 5,438,431 A | * | 8/1995 | Ostromoukhov | 358/3.18 |
| 5,633,729 A | * | 5/1997 | Smith et al. | 382/251 |
| 5,754,309 A | | 5/1998 | Chen et al. | 358/456 |
| 5,768,425 A | * | 6/1998 | Praveen et al. | 358/3.22 |
| 5,920,646 A | * | 7/1999 | Kamon | 382/173 |
| 5,949,964 A | * | 9/1999 | Clouthier et al. | 358/2.1 |
| 6,020,897 A | | 2/2000 | Carlsen et al. | 345/435 |
| 6,052,203 A | | 4/2000 | Suzuki et al. | 358/1.9 |
| 6,055,065 A | | 4/2000 | Rao et al. | 358/1.9 |
| 6,195,468 B1 | * | 2/2001 | Yoshida | 382/270 |
| 6,515,770 B1 | * | 2/2003 | Rao et al. | 358/3.13 |

* cited by examiner

*Primary Examiner*—Scott A. Rogers
(74) *Attorney, Agent, or Firm*—David W. Victor; Konrad Raynes & Victor LLP

(57) ABSTRACT

Disclosed is a method, system, and program for halftoning data for an output device capable of rendering multiple intensities. Input values are received. For each received input value, the input value is used as an output value if the input value is a predetermined value. Otherwise, if the input value is not the predetermined value, then the input value is halftoned to produce an output value used to render one of multiple intensities. This allows the use of data intended for bi-level printers that may have already been halftoned.

48 Claims, 3 Drawing Sheets

METHOD, SYSTEM, AND PROGRAM FOR HALFTONING DATA FOR RENDERING IN A MULTITONE OUTPUT DEVICE

CROSS-REFERENCE TO RELATED APPLICATIONS

This application is related to the following co-pending and commonly-assigned patent application entitled "Dithering Method and Apparatus for Multitone Printers," to Charles H. Morris, III, Joan L. Mitchell, Chai Wah Wu, Gehard R. Thompson, Charles P. Tresser, and Nenad Rijavec, having U.S. Pat. No. 6,714,318, and filed on Oct. 4, 1999. This patent application is incorporated herein by reference in its entirety

BACKGROUND OF THE INVENTION

1. Field of the Invention

The present invention relates to a method, system and program for halftoning input data to produce output values capable of being rendered by a multitone output device, such as a multitone printer.

2. Description of the Related Art

Digital images comprise pels or points of data that have one of many values representing a color or shade of gray value for that pel. For instance, many digital images may be expressed using 256 different intensities of gray, including black and white. However, laser printers are typically only capable of printing in black or white, or two different color values. To create the appearance of different shades of gray, prior art bi-level (i.e., black and white) laser printers utilize dithering algorithms. A dithering algorithm creates the illusion of new colors and shades by varying the pattern of dots. In this way, different shades or intensities of gray are produced by varying the patterns of black and white dots. In such bi-level printers there are no gray dots. However, there are output devices that include the full range of intermediate values and do not need halftoning, such as computer display monitors that display 16 million colors.

One common form of a dithering algorithm involves the use of a threshold matrix of values with which the values of picture elements or pels in the image are compared. The same matrix pattern is employed repeatedly to cover the image. The binary output value, i.e., black or white, for the bi-level printer is based on a comparison of whether the pel gray scale value is greater or less than the threshold value. The commonly assigned patent entitled "Clustered Aperiodic Mask", having U.S. Pat. No. 5,917,951 provides techniques for creating the threshold matrix.

The above techniques are intended for dithering gray scale data for a bi-level printer. However, multitone printers can print at least some intermediate levels between white, i.e., nothing printed, and the full saturation value, i.e., black. There is thus a need in the art for providing halftoning algorithms for use with multitone printers to provide improved results when images are halftoned and printed on multitone printers.

SUMMARY OF THE PREFERRED EMBODIMENTS

To overcome the limitations in the prior art described above, preferred embodiments disclose a method, system, and program for halftoning data for an output device capable of rendering multiple intensities. Input values are received. For each received input value, the input value is used as an output value if the input value is a predetermined value. Otherwise, if the input value is not the predetermined value, then the input value is halftoned to produce an output value used to render one of multiple intensities.

In certain embodiments, the input pel value is in a first intensity range and the output value is in a second intensity range of values that are capable of being rendered by the multitone printer. The intensity ranges may comprise intensities of grays or colors.

In further embodiments, halftoning the input value further comprises determining a value from a first matrix of values. The input value and the determined value are used to produce an intermediary output value in the first intensity range. A second matrix is used to determine one output value in the second intensity range based on the intermediary output value in the first intensity range. The second matrix provides one output value in the second intensity range for any given intermediate output value in the first intensity range.

In still further embodiments, a determination is made as to whether the input value is greater than the determined value from the first matrix. If the input value is greater than the determined value, then the second matrix is used to determine one output value in the second intensity range. Otherwise, if the input value is less than the determined value from the first matrix, then a predetermined output value in the second intensity range is used.

Preferred embodiments provide a technique for halftoning input data to produce output intensity values capable of being rendered by a multitone printer. With preferred embodiments, if the input data comprise binary values, i.e., black (full saturation) or white (zero intensity), then predetermined outputs, such as the actual binary values, are used as the output. Only if the input data is not binary values is a halftoning algorithm then applied to convert the input data to an output value. This preferred embodiment technique is intended to address the situation where the input data to the multitone printer may have already been halftoned. It has been observed that halftoning data already halftoned produces undesirable printing results.

The preferred embodiments address this problem by not subjecting pels in binary form that could have been subject to halftoning to yet further halftoning or dithering. Only if the pels are intermediate values between white (no printing) and black (full saturation) is the halftoning algorithm applied to produce output intensity values.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

The co-pending and commonly assigned U.S. patent application entitled "Dithering Method and Apparatus for Multitone Printers," having U.S. Pat. No. 6,714,318, incorporated by reference above, describes a technique for halftoning data for use with a multitone printer. This application describes a process involving the use of a threshold matrix M and decision matrix D.

The threshold matrix M provides threshold values $T_{ij}$ depending on the location of the input data P. The input data P may comprise a pel. The term "pel" as used herein refers to an intensity input at a data point that represents data to be rendered (i.e., printed, displayed, etc.), where the data to be rendered may include, but is not limited to, images, text, composite, graphs, collages, scientific data, video, etc.

The decision matrix D provides values that the multitone printer can print. U.S. Pat. No. 6,714,318 describes an algorithm where an input value $P_{u,v}$ is compared against the corresponding threshold value $T_{i,j}$ in the threshold matrix. The decision matrix D is used to determine the output intensity value capable of being rendered by the multitone printer. In one embodiment, the output value in the decision matrix is a function of T-P.

Undesirable output results have been observed if the algorithms using the threshold matrix M and decision matrix D described in U.S. Pat. No. 6,714,318 are applied to binary data that has already been processed with a halftoning algorithm.

Preferred embodiments provide a technique to account for the possibility that the input data to the multitone printer has already been halftoned by a dithering algorithm in order to avoid undesirable results from re-halftoning binary data.

Figure 1:
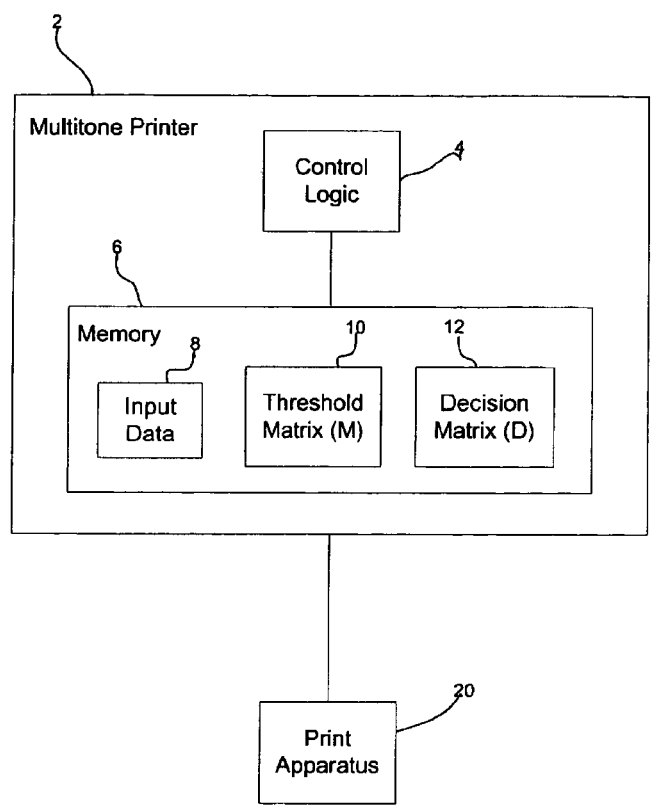
FIG. 1 illustrates a printing computing environment in which preferred embodiments are implemented.

FIG. 1 illustrates a printing computing environment in which preferred embodiments are implemented. A multitone printer 2 includes control logic 4 to perform the preferred embodiment halftoning operations. The control logic 4 may comprise a programmable chip, such as a field programable gate array (FPGA) chip, which includes logic. A memory device 6 includes input data 8, a threshold matrix (M) 10, and a decision matrix (D) 12. The memory device 6 may comprise any high speed memory device known in the art, such as a static random access memory (SRAM), random access memory (RAM), etc. The input data 8 comprises scan lines of pels that can be either in binary form, i.e., a high (black) or low (white) values, or gray scale values, e.g., 0 through 255. Further, some of the input data 8 could have previously been subject to halftoning and dithering algorithms.

In preferred embodiments, the control logic 4 accesses input data 8 from memory 6 and applies the threshold matrix 10 and decision matrix 12 to produce an output intensity representing either no printing, one of the multiple intermediate intensities, or a full saturation value (black) that the print apparatus 20 is capable of printing. For instance, if the print apparatus 20 can print fourteen intermediate values as well as full saturation, then the output value would comprise four bits to represent one of sixteen outputs. The print apparatus 20 may comprise any printing mechanism known in the art, including a laser beam, charged-coupled device (CCD), ink jets, material deposition, etc.

Figure 2:
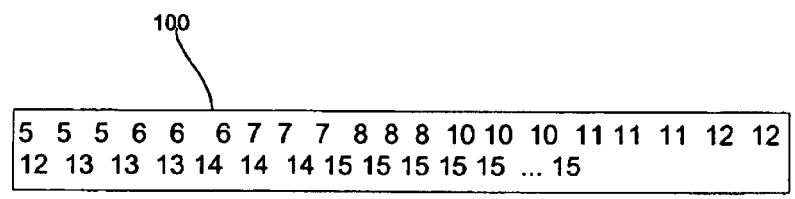
FIG. 2 illustrates examples of matrix data structures in accordance with preferred embodiments of the present invention.
Figure 2:
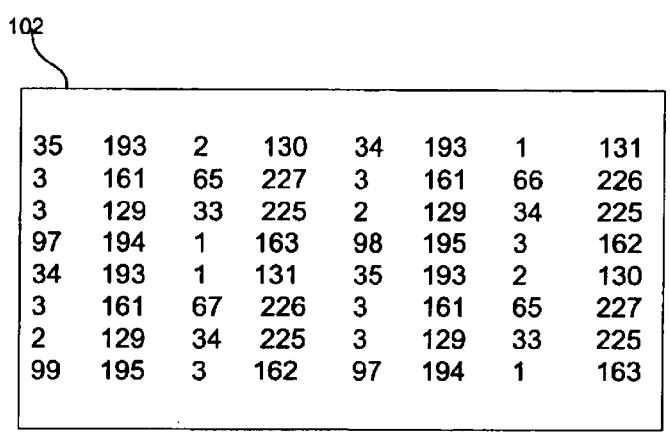

The decision matrix D 12 may include a ramp-up of the output intensity gray scale values supported by the multitone printer. Such a ramp-up in the values of the decision matrix D would involve repeating the output intensity values for consecutive index values, where the index values are the possible intermediate gray scale values. Further, with certain multitone printers that support up to sixteen different printing levels, certain of the lower gray scale values, e.g., the first three or four such output intensities, may produce unreliable results. In such case, the first output intensity in the matrix D would begin at the first reliable output intensity value, e.g., 3 or 4. An example of a decision matrix 100 is shown in FIG. 2. The decision matrix 100 includes an entry or value for each of the index values, such as 256 entries. In the matrix 100, the first reliable halftone produced by the multitone printer 2 is for the halftone value of 5. The decision matrix 100 ramps up fairly quickly and repeats the highest halftone value, which for this implementation is "15", for the most of the output values. In alternative embodiments, different arrangements of the output intensity values may be used to populate the decision matrix D.

In preferred embodiments, the threshold matrix M and decision matrix D comprise a point algorithm as the intensities rendered at each pel do not depend on the value of neighboring pels. This is in contrast to neighborhood algorithms, such as error diffusion, which require the neighboring input pels to determine the image to be printed. In general, point algorithms are faster and require less data storage then neighborhood algorithms.

Preferred embodiments are described in terms of gray scale images where each pel has a single value. For color images, each pel may be composed of three or more, typically four, color components, e.g., cyan (C), magenta (M), yellow (Y), and sometimes black (K). Each component of these CMY and CMYK images may be treated as a "gray scale" image of that component. Those skilled in the art will recognize how to extend the preferred embodiments from the gray scale images into multiple component color images. When printing a binary representation of each component of a color image, the threshold matrices are tuned for each color component. Thus, the dimensions of the threshold matrices and the values T contained therein may differ for each color component. In addition, with gray scale images, the value of 0 is used to represent white and the value of 255 represents full black (or full tone if color halftoning), however alternative conventions may be used such as the opposite values, which would use 255 for white and 0 for black.

The threshold matrix M includes threshold values $T_{ij}$ and has m×n entries. The decision matrix D includes output intensity values $d_{P,T}$ that are a function of the input value P and the corresponding threshold value in the threshold matrix $T_{ij}$. The input $P_{u,v}$ at location (u, v) will get printed as a dot of gray level $d_{P,T}$, where T is the corresponding threshold value $T_{ij}$, where i=u mod m and j=v mod n. This operation is performed by a lookup function. The output $d_{P,T}$ is sent to the print apparatus 20.

In preferred embodiments, the decision matrix D is used as a lookup table. If the decision matrix D is endowed with some special structure or is defined by some simple algorithmic procedure, then instead of looking-up $d_{P,T}$ in the matrix D, $d_{P,T}$ can be calculated directly by an algorithm, whose output $d_{P,T}$ is sent to the print apparatus 20.

FIG. 2 further provides an example of a threshold matrix 102. The values in the threshold matrix M may be generated using dithering algorithms known in the art. In populating the threshold matrix M, the goal is to produce a visually pleasing effect and smooth and monotonic gray scale transitions in the image. Techniques known in the art for designing threshold matrices for dithering for a bi-level printer (i.e., one that prints only black or white) may be used to design the threshold matrix used with the preferred embodiments. Further, the values selected for the threshold and decision matrices may be based on the printing capabilities of the multitone printer Still further, the threshold matrix M 102 in FIG. 2 alternates between small and large intensities, such that the values in a column are either all less than 128 or greater than 128. This pattern of output values in the threshold matrix M 102 in FIG. 2 forms vertical stripes of alternating intensity for uniform input values of 128. This arrangement is desirable because alternating the intensity of output values has been found to produce improved output results.

In preferred embodiments, the threshold matrix M is used to provide halftoning when the output device renders less than a fill range of intensities. However, certain output devices that provide a full range of intensities may not require halftoning. For instance, a display screen renders 16 million colors, and thus dithering and halftoning may not be needed to provide the illusion of various intensities because such various intensities are capable of being rendered. Nonetheless, even output devices rendering a complete range of intensities, such as a display screen capable of rendering 16 million colors, may still utilize halftoning to provide improved rendering results.

Figure 3:
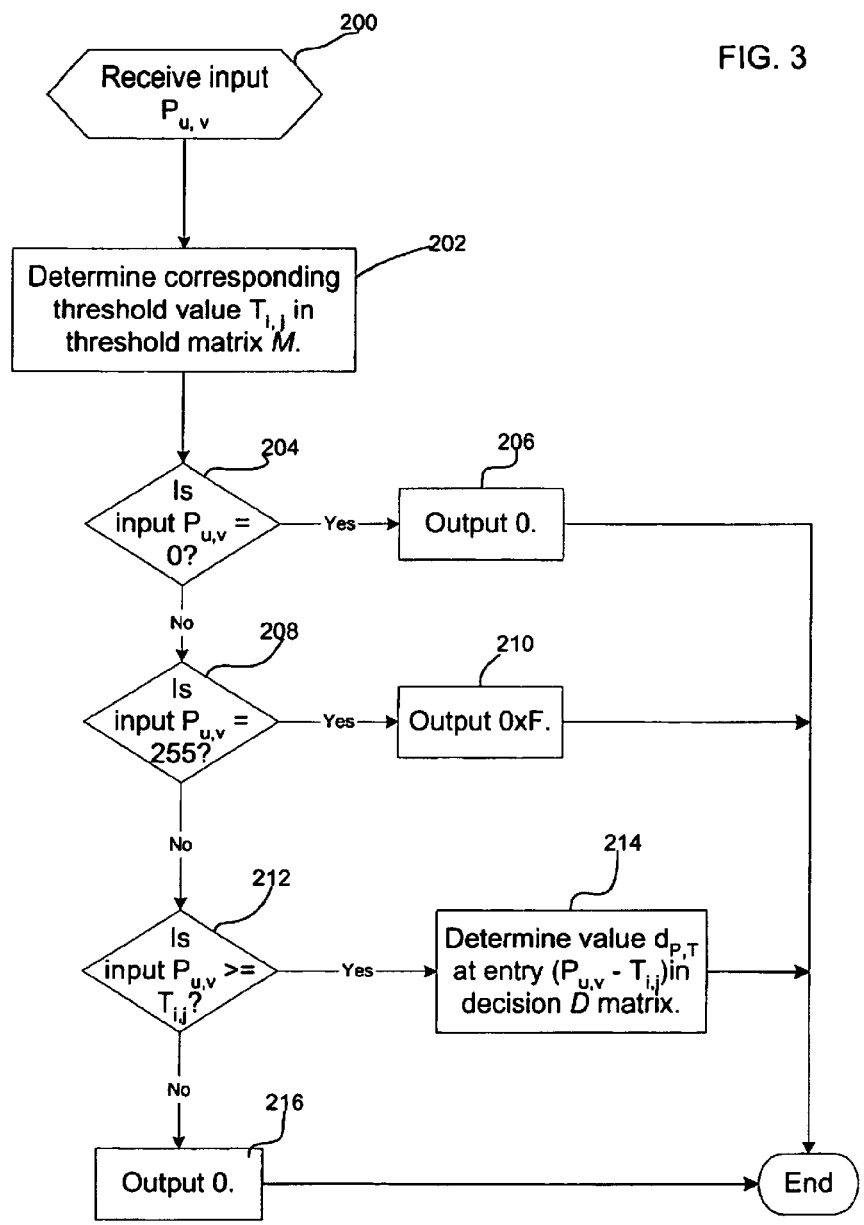
FIG. 3 illustrates logic to screen data for a multitone printer in accordance with preferred embodiments of the present invention.

FIG. 3 illustrates logic implemented in the control logic 4 to generate output values comprising output intensity values, e.g., one of the sixteen outputs the print apparatus 20 can render. The input data 8 to the control logic 4 may comprise gray scale values, e.g., 0 through 255, or already screened binary data that has one of two values, e.g., 0 or 255. Control begins at block 200 with the control logic 4 accessing an input pel $P_{u,v}$ from the input data 8. The control logic 4 determines (at block 202) a threshold value $T_{i,j}$ in the threshold matrix M based on the position of the input pel $P_{u,v}$ with respect to the threshold matrix M. For instance, if the threshold matrix M is an 8×8 matrix as shown in FIG. 2, then the threshold matrix M would provide threshold values for 8×8 windows of input data. If (at block 204) the input data $P_{u,v}$ is equal to zero, then the control logic 4 generates (at block 206) an output of zero. If (at block 208) the input pel $P_{u,v}$ is equal to 255, i.e., the highest gray scale value, then the output pel (at block 210) is O×F, or the highest output intensity gray scale value (e.g., 15 or full saturation).

Blocks 204 and 208 are intended to handle the situation where the input pel value is a binary value that may have already been halftoned by a dithering algorithm or data originally intended for a bi-level printer. In such case, the logic of FIG. 3 provides predetermined output intensity values corresponding to the input binary values. In this way, further halftoning and dithering of binary input data at the highest and lowest possible gray scale values is avoided.

If (at block 212) the input pel $P_{u,v}$ is greater than or equal to the determined threshold value $T_{i,j}$ then the control logic 4 determines (at block 214) the $(P_{u,v} - T_{i,j})$th entry in the decision matrix $D_{(P-T)}$ to determine the corresponding output intensity value $d_{P,T}$ for the difference. This determined output intensity value $d_{P,T}$ in the decision matrix D is then the output to the print apparatus 20. Otherwise, if the input value $P_{u,v}$ is less than the determined corresponding threshold value $T_{i,j}$, then the output is zero (at block 216). The steps at block 212 and 214 provide the halftoning of the input gray scale data that has not already been subjected to halftoning.

Thus, with the logic of FIG. 3, the input values are only halftoned if they are gray scale values, i.e., not possible binary values 0 or 255. If the input values are possible binary values, then the preferred logic does not re-halftone the data. This algorithm eliminates the possibility that already halftoned binary data will be halftoned again to avoid the undesirable results that have been observed with twice halftoned data. With the preferred logic, the dithering results of previously halftoned data will remain and be outputted to the print apparatus 20 as only intermediate gray scale data not previously halftoned will be subject to the transformation and dithering of the threshold matrix M. Thus, the logic of FIG. 3 is designed to optimally handle both halftoned binary data as well as gray scale intermediary input values. Note that blocks 204 and 208 could have preceded block 202.

Alternative Embodiments and Conclusions

This concludes the description of the preferred embodiments of the invention.

The following describes some alternative embodiments for accomplishing the present invention.

The preferred embodiments may be implemented as a method, apparatus or program using standard programming and/or engineering techniques to produce software, firmware, hardware, or any combination thereof. The program, code and instructions in which the preferred embodiments are implemented are accessible from and embedded in an information bearing medium, which may comprise one or more computer-readable devices, firmware, programmable logic, memory devices (e.g., EEPROMs, ROMs, PROMs, RAMs, SRAMs, etc.), hardware, electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. Of course, those skilled in the art will recognize that many modifications may be made to this configuration without departing from the scope of the present invention.

Preferred embodiments were described with respect to a printer output device. However, the output values may be rendered using output devices other than printers, such as such as display monitors, a storage device for future rendering, a transmission device, etc.

In preferred embodiment, the control logic is implemented as hardware, e.g., a Field Programmable Gate Array (FPGA), Application Specific Integrated Circuit (ASIC), etc. In alternative embodiments, the control logic may be implemented as programmable code in a programmable processor.

In preferred embodiments the range of intensity inputs is greater than the range of output intensities capable of being rendered on the output device or printer. In alternative embodiments, the range of intensity inputs may be less than the range of intensity outputs.

In preferred embodiments, there was one decision and one threshold matrix. In further embodiments, multiple decision and threshold matrices may be used.

Preferred embodiments described a screening process that used both a threshold matrix and decision matrix. However, those skilled in the art will appreciate that numerous screening algorithms may be applied to transform the gray scale data to output intensity values that can be rendered by the multitone printer.

In preferred embodiments, certain output values were determined from a table and others, 0 and 255, were bypassed using the algorithm of FIG. 3. In alternative embodiments, a look-up table may provide values for each possible input value, including 0 and 255, the extreme values.

The memory 6 may be implemented in one memory chip or dispersed throughout multiple memory chips. In alternative embodiments, the matrices 10 and 12 may be maintained in a magnetic memory, as opposed to an electronic memory 6. Still further, the matrices 10 and 12 may be encoded in hardware logic, such as ASICs, FPGAs, Electronically Erasable Programmable Read-Only-Memory (EEPROM), etc.

In summary, preferred embodiments disclose a method, system, and program for halftoning data for an output device capable of rendering multiple intensities. Input values are received. For each received input value, the input value is used as an output value if the input value is a predetermined value. Otherwise, if the input value is not the predetermined value, then the input value is halftoned to produce an output value used to render one of multiple intensities. The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for halftoning data for an output device capable of rendering multiple intensities, comprising:
   receiving input values;
   for each received input value, performing:
      (i) using the input value as an output value if the input value is a predetermined value; and
      (ii) halftoning the input value to produce an output value used to render one of multiple intensities if the input value is not the predetermined value.

2. The method of claim 1, further comprising using the output values to select intensities to be rendered on the output device.

3. The method of claim 1, wherein the predetermined value represents full saturation.

4. The method of claim 1, wherein the output device comprises one of a printer, display monitor, storage or transmission device.

5. The method of claim 1, wherein there are two predetermined values, and wherein the input value is used as the output value if the input value is one of the predetermined values.

6. The method of claim 1, further comprising using the output values to select intensities to be rendered on the output device.

7. The method of claim 1, wherein the input value is in a first intensity range and the output value is in a second intensity range of values that are capable of being rendered by the output device.

8. The method of claim 7, wherein the first and second intensity ranges comprise a plurality of intensity values, and wherein the second intensity range has fewer intensity values than the first intensity range.

9. The method of claim 7, wherein the first and second intensity ranges comprise a plurality of intensity values, and wherein the first intensity range has fewer intensity values than the second intensity range.

10. The method of claim 7, wherein halftoning the input value further comprises:
   determining a value for the input value from a first matrix of values;
   using the input value and the determined value to produce an intermediate output value in the first intensity range; and
   using a second matrix to determine one output value in the second intensity range based on the intermediate output value in the first intensity range, wherein the second matrix provides one output value in the second intensity range for any given intermediate output value in the first intensity range.

11. The method of claim 10, wherein using the input value and the determined value from the first matrix comprises:
   subtracting the determined value from the input value to produce the intermediary output value.

12. The method of claim 10, further comprising:
   determining whether the input value is greater than or equal to the determined value from the first matrix, wherein the second matrix is used to determine one output value in the second intensity range if the input value is greater than the determined value; and
   using a predetermined output value in the second intensity range if the input value is less than the determined value from the first matrix.

13. The method of claim 12, wherein the predetermined output value used if the input value is less than the determined value from the first matrix comprises a lightest color value in the second intensity range.

14. The method of claim 10, wherein the second matrix comprises a mapping of intermediate output values in the first intensity range to monotonically increasing values in the second intensity range, and wherein multiple values from the first intensity range map to a same value from the second intensity range.

15. The method of claim 10, wherein the first matrix is produced using a dithering algorithm.

16. The method of claim 10, wherein the second matrix does not include any output intensity values in the second intensity range that produce unreliable print results.

17. A system for halftoning data, comprising:
   an output device capable of rendering multiple intensities;
   means for receiving input values;
   means for performing, for each received input value:
      (i) using the input value as an output value if the input value is a predetermined value; and
      (ii) halftoning the input value to produce an output value used to render one of multiple intensities on the output device if the input value is not the predetermined value.

18. The system of claim 17, further comprising means for using the output values to select intensities to be rendered on the output device.

19. The system of claim 17, wherein the predetermined value represents full saturation.

20. The system of claim 17, wherein the output device comprises one of a printer, display monitor, storage or transmission device.

21. The system of claim 17, wherein there are two predetermined values, and wherein the input value is used as the output value if the input value is one of the predetermined values.

22. The system of claim 17, further comprising means for using the output values to select intensities to be rendered on the output device.

23. The system of claim 17, wherein the input value is in a first intensity range and the output value is in a second intensity range of values that are capable of being rendered by the output device.

24. The system of claim 23, wherein the first and second intensity ranges comprise a plurality of intensity values, and wherein the second intensity range has fewer intensity values than the first intensity range.

25. The system of claim 23, wherein the first and second intensity ranges comprise a plurality of intensity values, and wherein the first intensity range has fewer intensity values than the second intensity range.

26. The system of claim 23, wherein the means for halftoning the input value further comprises:

determining a value for the input value from a first matrix of values;

using the input value and the determined value to produce an intermediate output value in the first intensity range; and using a second matrix to determine one output value in the second intensity range based on the intermediate output value in the first intensity range, wherein the second matrix provides one output value in the second intensity range for any given intermediate output value in the first intensity range.

27. The system of claim 26, wherein the means for using the input value and the determined value from the first matrix comprises:

subtracting the determined value from the input value to produce the intermediary output value.

28. The system of claim 26, further comprising:

means for determining whether the input value is greater than or equal to the determined value from the first matrix, wherein the second matrix is used to determine one output value in the second intensity range if the input value is greater than the determined value; and means for using a predetermined output value in the second intensity range if the input value is less than the determined value from the first matrix.

29. The system of claim 28, wherein the predetermined output value used if the input value is less than the determined value from the first matrix comprises a lightest color value in the second intensity range.

30. The system of claim 26, wherein the second matrix comprises a mapping of intermediate output values in the first intensity range to monotonically increasing values in the second intensity range, and wherein multiple values from the first intensity range map to a same value from the second intensity range.

31. The system of claim 26, wherein the first matrix is produced using a dithering algorithm.

32. The system of claim 26, wherein the second matrix does not include any output intensity values in the second intensity range that produce unreliable print results.

33. A program for halftoning data for an output device capable of rendering multiple intensities, wherein the program includes code embedded in a computer readable medium and capable of causing a processor to perform:

receiving input values;

for each received input value, performing:

(i) using the input value as an output value if the input value is a predetermined value; and (ii) halftoning the input value to produce an output value used to render one of multiple intensities if the input value is not the predetermined value.

34. The program of claim 33, wherein the program code is further capable of causing the processor to perform using the output values to select intensities to be rendered on the output device.

35. The program of claim 33, wherein the predetermined value represents full saturation.

36. The program of claim 33, wherein the output device comprises one of a printer, display monitor, storage or transmission device.

37. The program of claim 33, wherein there are two predetermined values, and wherein the input value is used as the output value if the input value is one of the predetermined values.

38. The program of claim 33, wherein the program code is further capable of causing the processor to perform using the output values to select intensities to be rendered on the output device.

39. The program of claim 33, wherein the input value is in a first intensity range and the output value is in a second intensity range of values that are capable of being rendered by the output device.

40. The program of claim 39, wherein the first and second intensity ranges comprise a plurality of intensity values, and wherein the second intensity range has fewer intensity values than the first intensity range.

41. The program of claim 39, wherein the first and second intensity ranges comprise a plurality of intensity values, and wherein the first intensity range has fewer intensity values than the second intensity range.

42. The program of claim 39, wherein halftoning the input value further comprises:

determining a value for the input value from a first matrix of values;

using the input value and the determined value to produce an intermediate output value in the first intensity range; and using a second matrix to determine one output value in the second intensity range based on the intermediate output value in the first intensity range, wherein the second matrix provides one output value in the second intensity range for any given intermediate output value in the first intensity range.

43. The program of claim 42, wherein using the input value and the determined value from the first matrix comprises:

subtracting the determined value from the input value to produce the intermediary output value.

44. The program of claim 42, wherein the program code is further capable of causing the processor to perform:

determining whether the input value is greater than or equal to the determined value from the first matrix, wherein the second matrix is used to determine one output value in the second intensity range if the input value is greater than the determined value; and using a predetermined output value in the second intensity range if the input value is less than the determined value from the first matrix.

45. The program of claim 44, wherein the predetermined output value used if the input value is less than the determined value from the first matrix comprises a lightest color value in the second intensity range.

46. The program of claim 42, wherein the second matrix comprises a mapping of intermediate output values in the first intensity range to monotonically increasing values in the second intensity range, and wherein multiple values from the first intensity range map to a same value from the second intensity range.

47. The program of claim 42, wherein the first matrix is produced using a dithering algorithm.

48. The program of claim 42, wherein the second matrix does not include any output intensity values in the second intensity range that produce unreliable print results.

* * * * *